(12) United States Patent
Pashenkov et al.

(10) Patent No.: US 7,565,598 B2
(45) Date of Patent: Jul. 21, 2009

(54) ERROR CORRECTION FOR DISK STORAGE MEDIA

(75) Inventors: Serge Pashenkov, Redwood City, CA (US); Alex Miroshnichenko, San Francisco, CA (US); Chris Carpenter, Sunnyvale, CA (US)

(73) Assignee: PowerFile, Inc., Foster City, CA (US)

( * ) Notice: Subject to any disclaimer, the term of this patent is extended or adjusted under 35 U.S.C. 154(b) by 0 days.

(21) Appl. No.: 11/835,971

(22) Filed: Aug. 8, 2007

(65) Prior Publication Data

US 2008/0040645 A1 Feb. 14, 2008

Related U.S. Application Data

(60) Provisional application No. 60/822,024, filed on Aug. 10, 2006.

(51) Int. Cl.
*G11C 29/00* (2006.01)
(52) U.S. Cl. .................. 714/766; 714/758; 714/781; 714/799; 714/52; 714/54
(58) Field of Classification Search ............. 714/758, 714/781, 799, 763, 52, 54
See application file for complete search history.

(56) References Cited

U.S. PATENT DOCUMENTS

| 5,774,292 | A | * | 6/1998 | Georgiou et al. | 360/73.03 |
| 5,812,501 | A | * | 9/1998 | Moribe et al. | 369/53.22 |
| 6,931,576 | B2 | | 8/2005 | Morrison et al. | |
| 6,976,146 | B1 | * | 12/2005 | Aiello et al. | 711/202 |
| 2002/0021517 | A1 | * | 2/2002 | Katayama et al. | 360/48 |
| 2005/0086241 | A1 | * | 4/2005 | Ram et al. | 707/100 |

OTHER PUBLICATIONS

PCT International Search Report and Written Opinion, PCT/US07/75632, Jul. 22, 2008, 7 pages.

* cited by examiner

*Primary Examiner*—Esaw T Abraham
(74) *Attorney, Agent, or Firm*—Fenwick & West LLP

(57) ABSTRACT

Embodiments of the invention provide methods and systems for improving the reliability of data stored on disk media. Logical redundancy is introduced into the data, and the data within a logical storage unit is divided into sectors that are spatially separated by interleaving them with sectors of other logical storage units. The logical redundancy and spatial separation reduce or minimize the effects of localized damage to the storage disk, such as the damage caused by a scratch or fingerprint. Thus, the data is stored on the disk in a layout that improves the likelihood that the data can be recovered despite the presence of an error that prevents one sector from being read correctly.

13 Claims, 8 Drawing Sheets

ERROR CORRECTION FOR DISK STORAGE MEDIA

CROSS-REFERENCE TO RELATED APPLICATION(S)

This application claims priority under 35 U.S.C. § 119(e) to U.S. Provisional Patent Application No. 60/822,024 filed Aug. 10, 2006, which is hereby incorporated by reference in its entirety.

BACKGROUND OF THE INVENTION

1. Field of the Invention

This invention pertains in general to data storage, and in particular to systems and methods of error correction for data stored on optical or other disk storage media.

2. Description of the Related Art

As increasing numbers of users make computers part of their everyday business and personal activities, the amount of data stored on computers has increased exponentially. Computer systems store vast music and video libraries, precious digital photographs, valuable business contacts, critical financial databases, and hoards of documents and other data. Common storage means include optical or other disk storage media.

Unfortunately, since the advent of computers, there has been an ever-present risk of losing data that is stored on computer-readable media. Because the consequences of such losses can be dire, methods of decreasing the likelihood of unrecoverable errors have been developed. For example, Redundant Array of Independent Disks (RAID) techniques have been developed to offer a higher level of protection (fault tolerance) from data loss that can occur from malfunctions of a disk. RAID techniques, including RAID levels 0 through 5, use multiple disks to form one logical storage unit. Despite the implementation of RAID techniques, there remains very high unrecoverable error rates in reading storage media, which are particularly problematic outside of the entertainment content delivery context.

What are needed are methods and systems for recovering data from disks that have suffered mechanical damage from common causes of errors, such as a fingerprint or scratch.

SUMMARY

Embodiments of the invention provide methods and systems for improving the reliability of data stored on disk media. Logical redundancy is introduced into the data, and the data within a logical storage unit is divided into sectors that are spatially separated by interleaving them with sectors of other logical storage units. The logical redundancy and spatial separation reduce or minimize the effects of localized damage to the storage disk, such as the damage caused by a fingerprint or scratch. Thus, the data is stored on the disk in a layout that improves the likelihood that the data can be recovered despite the presence of an error that prevents one sector from being read correctly.

In one embodiment, a method is provided to calculate the number of sectors per logical storage unit to meet particular reliability performance goals. In another embodiment, a method is provided to tune the error rate for the storage disk based on the acceptable loss of disk capacity for reliability improvement. In yet another embodiment, the logical and spatial separation schemes are implemented according to a zoned layout of the disk media.

In another embodiment, the methods of the invention are implemented by a permanent storage appliance that stores data on a collection of optical discs using one or more disk drives organized in one or more jukeboxes within an optical media library. Additional storage space or storage locations can be added by connecting additional media libraries.

The present invention has various embodiments, including as a computer implemented process, as computer apparatuses, and as computer program products that execute on general or special purpose processors. The features and advantages described in this summary and the following detailed description are not all-inclusive. Many additional features and advantages will be apparent to one of ordinary skill in the art in view of the drawings, detailed description, and claims.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1A:
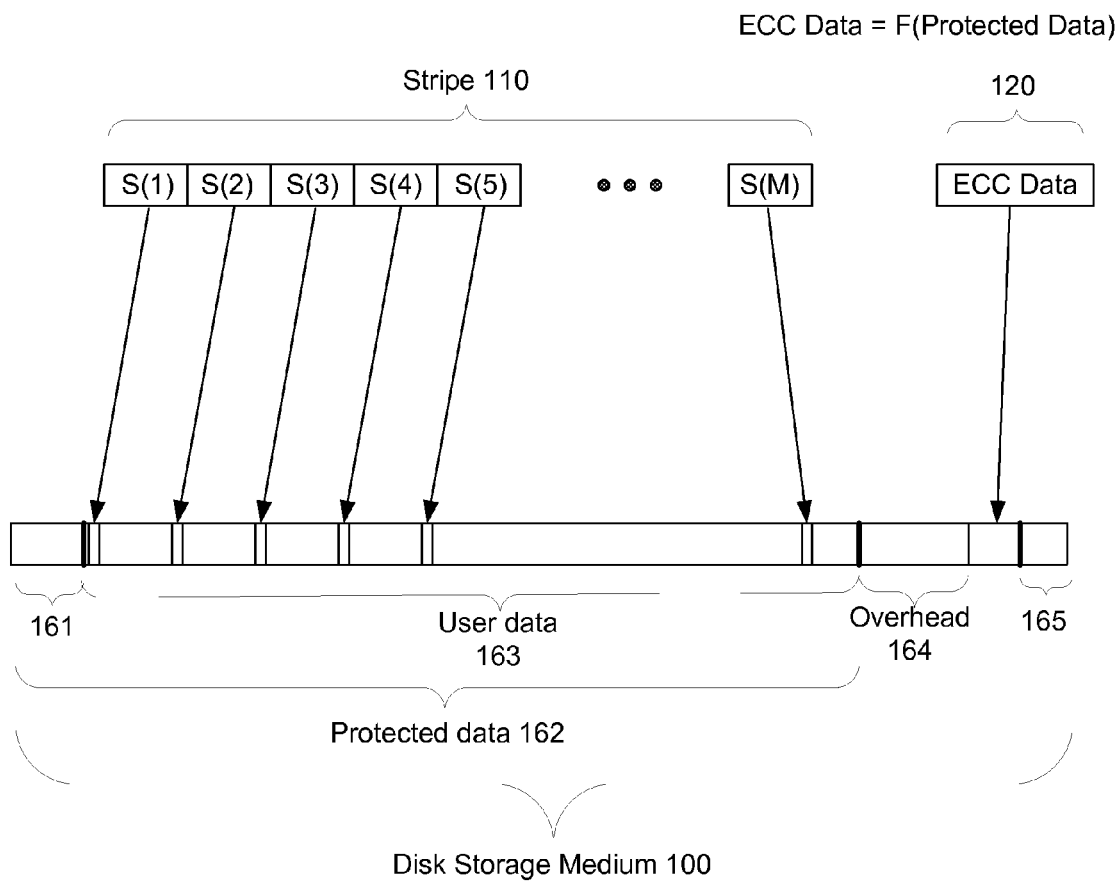
FIG. 1A illustrates the logical redundancy and spatial separation of the data recorded on a disk storage medium, in accordance with one embodiment.

FIG. 1A illustrates the logical redundancy 101 and spatial separation 151 of the data recorded on a disk storage medium, in accordance with one embodiment. The data layout is designed to reduce or minimize the effects of local damage. The disk storage medium 100 includes an area of the disk with protected data 162. The protected data 162 can be any combination of or subpart of one or more of the user data 163 and overhead, such as the data at the beginning of the disk, referred to herein as "header data" 161. As will be recognized by one of ordinary skill in the art, the contents of header data 161 may depend on the type, format, and organization of the disk storage medium 100. In the example shown in FIG. 1A, the protected data 162 includes the user data 163 and the header data 161. In other examples, the protected data 162 may include only the user data, or may include a portion of the user data, such as a single session, or may include a portion of the user data and a portion of the overhead, or any other combination of the user data and overhead. The disk storage medium 100 also includes overhead 164, Error Correction Code (ECC) data 120, and data at the end of the disk, referred to herein as "trailer data" 165. One of ordinary skill in the art will also appreciate that the contents of the overhead 164 and trailer data 165 may likewise depend on the type, format, and organization of the disk storage medium 100. The error correction code data 120 is the redundancy data computed from the protected data 162 with the use of an ECC algorithm. In other words, the ECC data is a function of the protected data 162, as will be described further below.

FIG. 1A illustrates a generalized example of how logical redundancy 101 can be introduced into the stored data on the disk storage medium 100. The protected data 162 including the user data 163 is divided into basic data blocks, referred to herein as sectors. Each sector has a size of S(B), which in one embodiment is between 2 KB and 32 KB. A logical storage unit is referred to as a stripe 110. A stripe 110 contains a number of sectors S(1), S(2), . . . S(M) that is greater than or equal to one. Multiple stripes 110 can reside within the protected data 162 and can be interleaved together. In one embodiment, all stripes 110 contain the same number of sectors. Alternatively, the stripe size may vary with radial position. As will be explained in further detail below, the relative size of common errors changes as a function of radial position on a disk storage medium. A larger stripe size reduces the space needed to store the ECC data, thus increases the space available to store user data 163 and improves efficiency of the storage medium.

Each stripe 110 has corresponding redundant data stored in the ECC data 120. The ECC data 120 is the redundancy data computed from the protected data 162 with the use of an ECC algorithm. Any ECC algorithm known in the art, including but not limited to checksums, can be used. Thus, if the ECC data 120 or any sector(s) S(1), S(2), . . . , S(M) of stripe 110 are affected by an error, the data can be recovered using the other sectors.

FIG. 1A also illustrates a generalized example of how spatial separation 151 can be implemented. As shown in FIG. 1A, the sectors S(1), S(2), . . . , S(M) of one stripe 110 are distributed throughout the user data 163. Thus, sectors from the same stripe 110 do not occur in the immediate vicinity of each other. The spatial separation 151 of sectors from a stripe 110 is beneficial because it reduces the likelihood that common causes of errors, such as thumbprints or scratches will compromise more than one sector of a stripe 110. The placement of the sectors of a stripe 110 and the placement of the ECC data 120 are not limited to those shown in FIG. 1A. In other embodiments, the ECC data 120 and sectors of a stripe 110 occur elsewhere on the disk, but in general, sectors from the same stripe 110 and the corresponding ECC data 120 are spatially separated from one another.

Figure 1B:
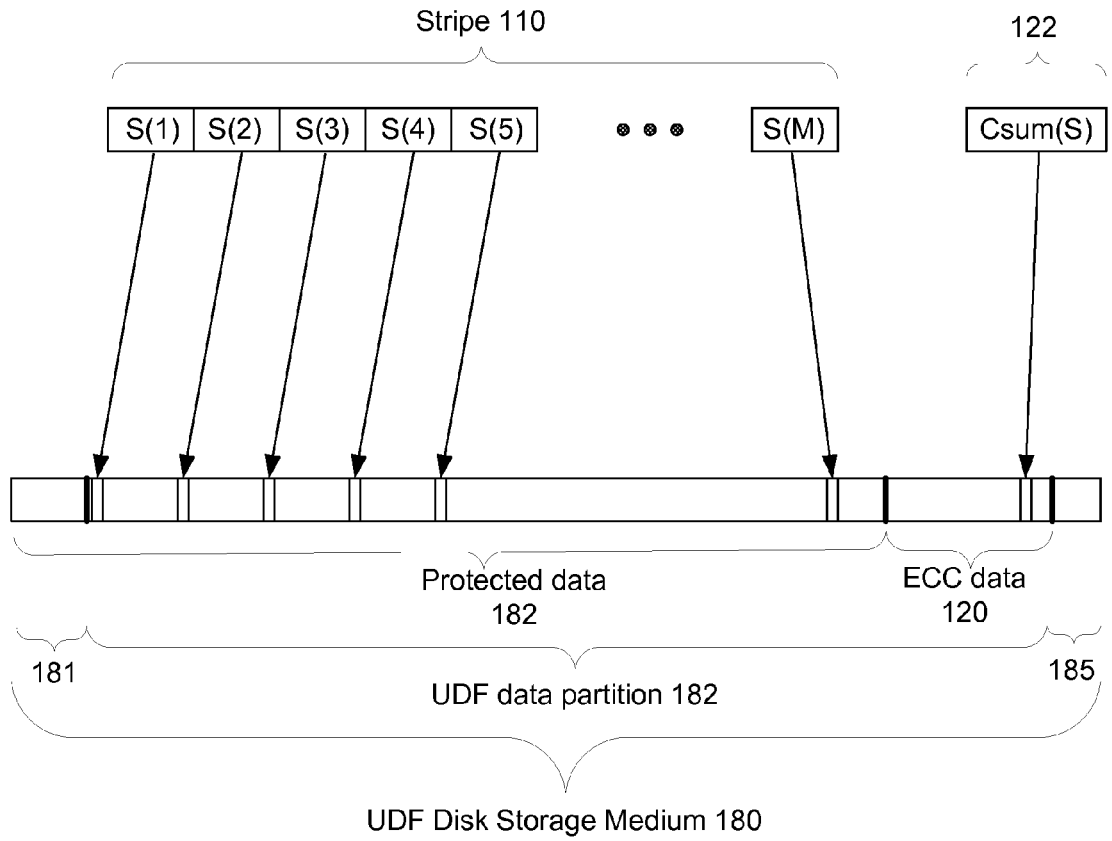
FIG. 1B illustrates an example of logical redundancy and spatial separation of the data recorded on a UDF disk, in accordance with one embodiment.

FIG. 1B illustrates a specific example of logical redundancy 101 and spatial separation 151 of the data recorded on a UDF disk 180 in accordance with one embodiment of the invention. In this embodiment, the layout of the data is UDF compatible and can be read on any standard system. The UDF disk 180 comprises a UDF data partition 182 bracketed by a UDF header 181 and a UDF trailer 185. The terms "UDF header" 181 and "UDF trailer" 185 refer to sections of the UDF disk 180 that may contain standard UDF information for UDF compliance and/or other data, as will be recognized by one of skill in the art. In the example shown in FIG. 1B, the protected data 182 includes the UDF header 181 and a section of the UDF data partition 182 containing user data. In one implementation, the UDF trailer 185 is not also included in the protected data 182 because it contains a copy of the information in the UDF header 181. The protected data 182 is divided into stripes 110, and ECC data 120 is the redundancy data computed from the protected data 182 with the use of an ECC algorithm. In this example, a checksum, Csum(S) 122, is used, as described below.

For each stripe 110, a checksum is calculated using Csum (S)=S(1) XOR S(2) . . . XOR S(M), similar to the checksum calculation used for disk RAID subsystems known in the art. The checksum 122 for each stripe 110 is written to a sector within the ECC data 120 on the UDF disk 180. In one embodiment, the Csum sector 122 is of the same size as the sectors in stripe 110. If the Csum(s) or any one sector S(1), S(2), . . . , S(M) of stripe 110 is affected by an error, the data can be recovered using the other sectors.

In the implementation of logical redundancy 101, there is a tradeoff between capacity for data storage and error rate improvement. In one embodiment, a 10% capacity penalty is paid to attain approximately $10^6$ error rate improvement. For discussion purposes, assume that the error rate is uniform across the recorded area of the UDF disk storage medium 180. To calculate the reliability improvement, assume that the probability of one S(B) size block being unreadable is $Ps_1$. According to one estimate taken from the industry-specified DVD unrecoverable read error rate, $Ps_1=10^{-12} \times Nbits$. For S(B)=2 KB, Nbits is approximately $2 \times 8 \times 10^3$ or approximately $10^4$. Therefore, $Ps_1$=approximately $10^{-8}$ for one error. For the above error protection method to fail, there has to be a second error affecting one of the M+1 sectors (sectors in stripe 110 or the associated Csum(S) sector 122) where the first error occurred. It is assumed that the first error and the second error are independent events, and therefore the probability of the second error alone would be $Ps_2=Ps_1 \times (M+1)$. For M>6, assume for simplicity M+1=10. Thus, $Ps_2$ is an order of magnitude larger than $Ps_1$. The total probability of the error protection method to fail is then $Ps_1 \times Ps_2 = (Ps_1)^2 \times 10 = 10^{-15}$. It can be shown that the equivalent value for tape storage media using the same block size is $10^{-17} \times 10^4 = 10^{-13}$. Thus, an improvement of at least two orders of magnitude can be obtained using embodiments of the present invention.

The most important assumption in the calculation above is the estimate for the combined error probability. Assuming it is correct, the effects of the various parameters will now be discussed. Increasing M allows a reduction in the checksum overhead. Note that unlike disk RAID, the CPU consumption is not as important because the XOR CSum calculation is performed only when preparing the optical images for burning. Also unlike RAID, there is a lack of sensitivity to the effects of CPU demands growing with the increase in M. Regardless of the number of sectors in a stripe 110, an XOR function will be applied once to the entire contents of the protected data 182. However, the larger the number of sectors in a stripe 110, the less reliability improvement is obtained. Thus, to maximize the reliability improvements, a minimum value of S(B) and the minimum value of M is used, which is determined by the amount of storage sacrificed for the sake of reliability improvement. For example, if no more than 15% of the UDF disk storage space of which 7% is lost due to the high error rate at the outer edge, then approximately 8% is available for the ECC data 120, which translates into a stripe size of M=12. Alternatively, if the outer edge of the disk is used for ECC data 120, then the calculation must be adjusted for a different error rate in the ECC data 120 compared to the rest of the protected data 182.

As described above, the present invention improves the reliability of data stored on disk media by using logical redundancy and spatial separation to minimize the effects of localized damage to the storage disk, such as the damage caused by a fingerprint or a scratch. In contrast, standard DVD error correction protects against manufacturing defects of the surface. The methods and systems of the present invention can work in addition to standard DVD error correction, and protects against different sources of error and different error patterns. The two techniques are complimentary and can be employed together for greater protection of stored data. As described herein, the logical redundancy and spatial separation techniques are used on a single disk. However, if additional disks or disk media is available, the logical redundancy and spatial separation can be extended across pieces of media, as will be understood to those of skill in the art. Although the optimal stripe length or other factors may change to accommodate different error patterns, the systems and methods disclosed herein can be used to target an acceptable error rate and efficiency level across the group of disks.

Figure 2:
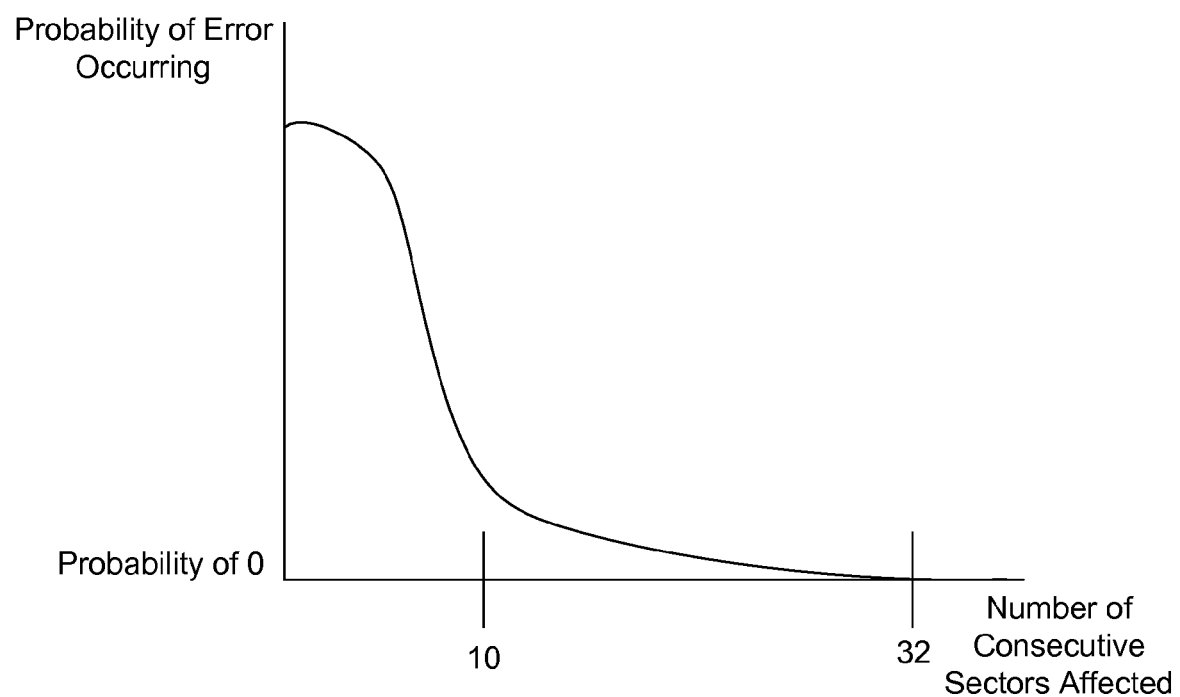
FIG. 2 illustrates a graph of the relationship between the probability of an error occurring versus and the number of consecutive sectors of a disk affected.

FIG. 2 illustrates a graph of the relationship between the probability of an error occurring versus and the number of consecutive sectors of a disk affected. FIG. 2 shows that generally there is an inverse relationship between the variables. Whereas there are a relatively great number of errors that affect a small number of consecutive sectors, there are relatively few errors that affect a large number of consecutive sectors. Based on the data studied by the inventors from DVD+R DL technology, two points are of particular interest: there appears to be a large decrease in probability through ten consecutive sectors, and there appears to be no appreciable decrease in probability beyond 32 sectors. This relationship is used to inform the placement of sectors of a stripe so as to reduce the likelihood that an error would affect more than one sector of a stripe. In one embodiment, sectors of a stripe are placed at intervals of at least 10 sectors. In another embodiment, the sectors of a stripe are placed at intervals of at least 32 sectors.

Figure 3:
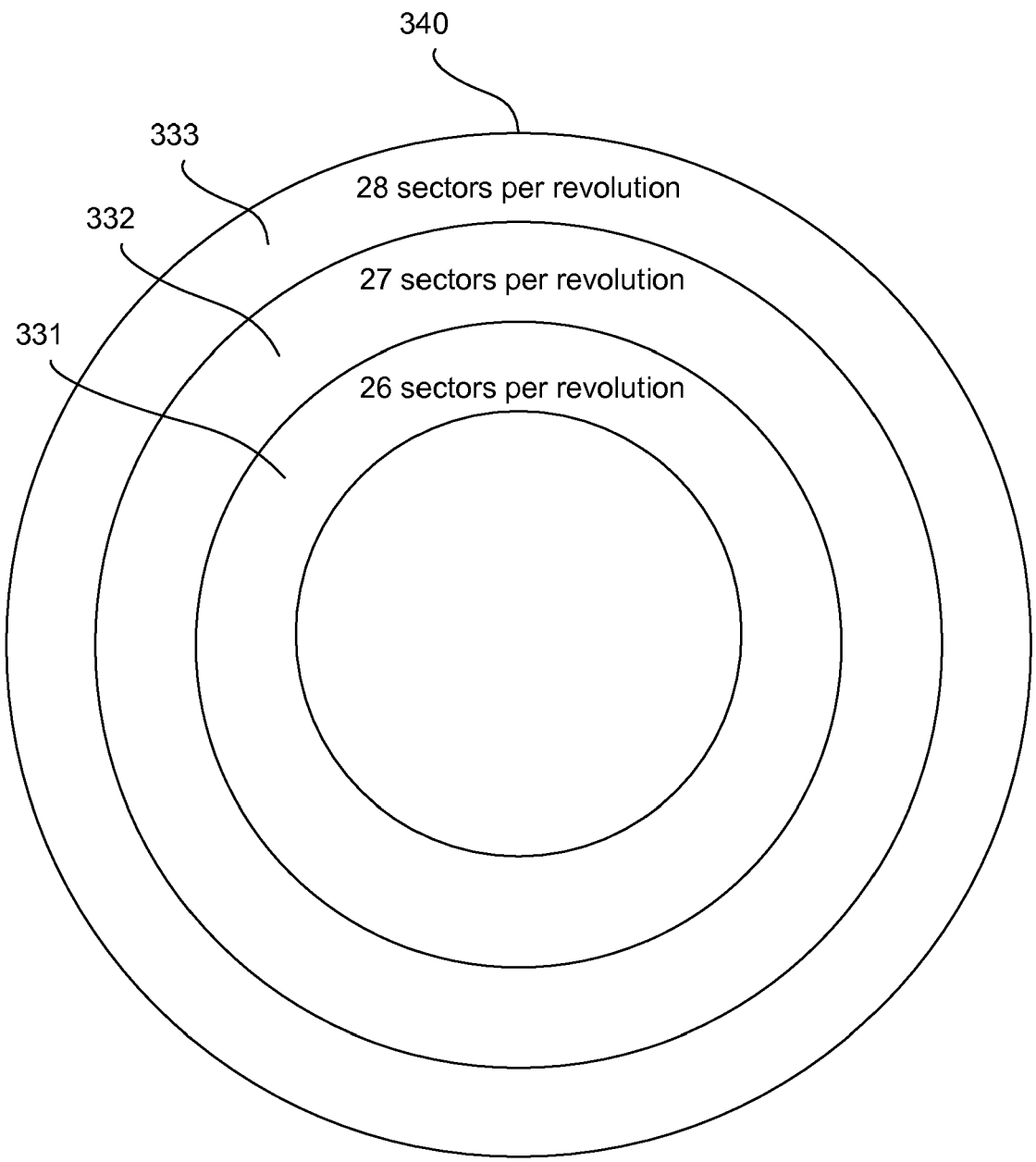
FIG. 3 illustrates the number of sectors per revolution at various radial bands on the disk, in accordance with one embodiment.

FIG. 3 illustrates the number of sectors per revolution at various radial bands on the disk 340, in accordance with one embodiment. As shown, the surface of disk 340 is divided into bands 331, 332, 333 based on the number sectors that complete one revolution of the disk 340. As shown, there are three bands 331, 332, 333, each having a respective number of sectors per revolution, but the bands shown in FIG. 3 are merely examples. The number of sectors per revolution and the number of bands on the disk depends upon the dimensions of the surface of the storage media and the physical length of a sector. As the radius increases, the number of sectors per revolution increases. This relationship is also used to inform the placement of sectors of a stripe so as to reduce the likelihood that an error would affect more than one sector of a stripe. For example, one arrangement places sectors two revolutions plus three sectors away from the previous sector in the stripe, so that the sectors are offset along two axes from each other. As the number of sectors per revolution increases, so does the interval at which the sectors of a stripe are placed.

In one embodiment, the surface of the disk 340 is divided into zones, which may correspond to one or more bands. For example, a three-zone ECC design may include one zone per each of the three bands 331, 332, 333, but in other embodiments, the zones do not necessarily correspond to the bands. A zoned-ECC design takes advantage of the fact that error size, i.e., the angular extent or sweep of an error, relative to the circumference of a ring on the surface of the disk decreases as a function of radial position. For example, a thumbprint covers approximately 45 degrees at the inner diameter of the storage area of a 5.25 inch optical disk, but only approximately 22 degrees at the outer diameter of that disk. Therefore, in one simple implementation, the stripe length in a zone may be calculated to be the number of sectors that fit in one revolution plus one sector of ECC data, where the sectors in the revolution are sufficiently spaced to avoid a thumbprint compromising more than one sector. In this implementation, the stripe length in a zone at the inner diameter may be calculated to be 360 degrees divided by 45 degrees, plus 1, which equals 9. The stripe length in the zone at the outer diameter may be calculated to be 360 degrees divided by 22 degrees, plus 1, which equals 17. In this example, the error rate is expected to be the same at both the inner diameter and the outer diameter, but the efficiency is higher at the outer diameter. This principle can be applied to additional zones between the zone at the inner diameter and the zone at the outer diameter.

Figure 4:
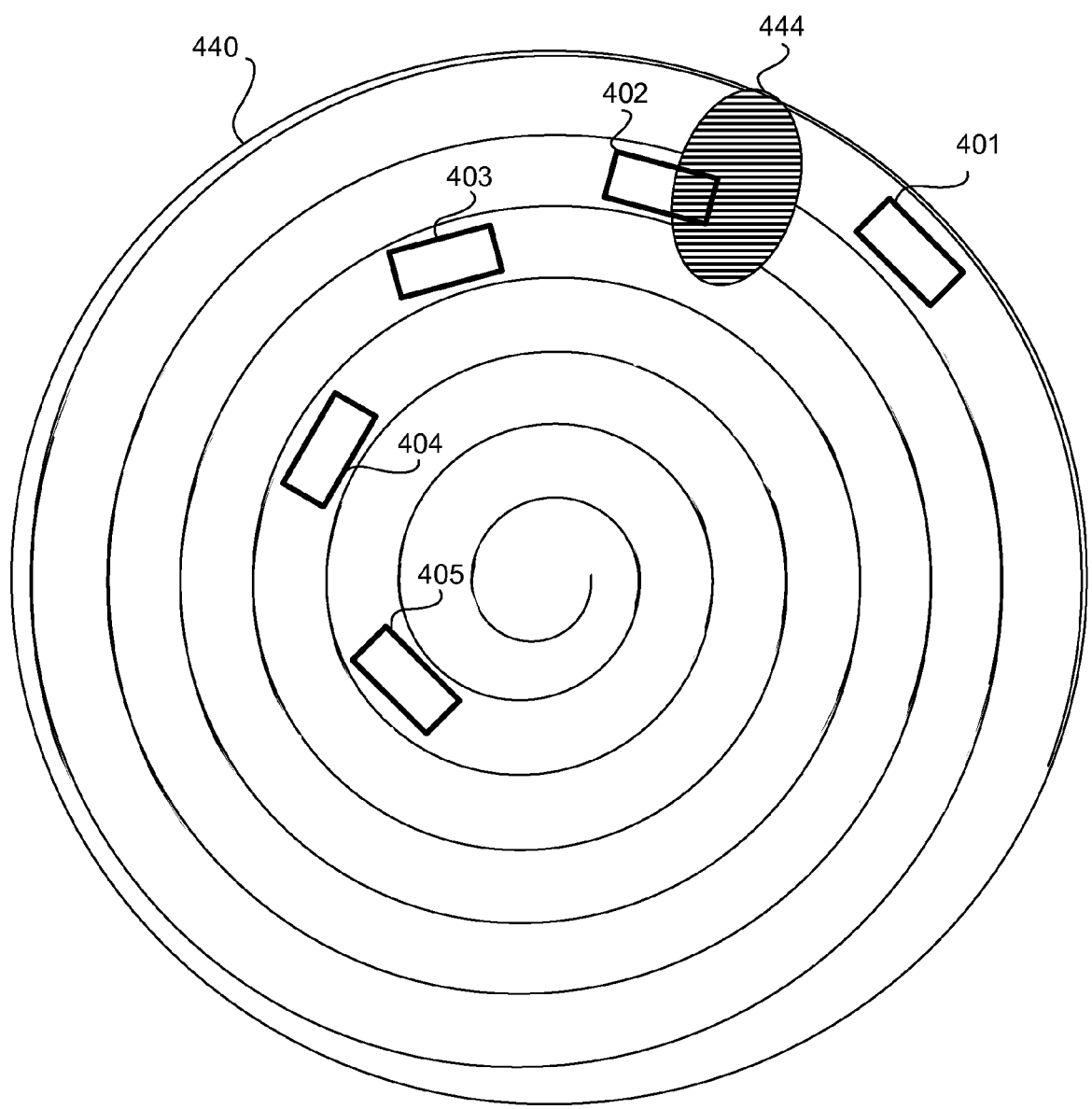
FIG. 4 illustrates the physical separation on a disk of sectors within a stripe, in accordance with one embodiment.

FIG. 4 illustrates the physical separation on a disk 440 of sectors 401-405 within a stripe, in accordance with one embodiment. As shown, the stripe includes five sectors 401-405 that have been written to disk 440 along the spiral of available data storage space on the disk 440. As shown in FIG. 4, data is written in a spiral track format, but in other embodiments, data may be written in a concentric track format as determined by the type of disk media used. FIG. 4 illustrates the concept of physical separation of sectors 401-405, but in other implementations, there may be many more revolutions in the spiral of data storage space on the disk 440 and there may be many more sectors within a stripe. The sectors 401-405 can interleaved with other data on the disk 440 or empty space so as to preserve the physical spatial separation of the sectors 401-405. Thus, common mechanical causes of errors, such as a fingerprint 444 are unlikely to affect more than one of the sectors 401-405. As shown in FIG. 4, the thumbprint 444 has compromised sector 402, but not affected sectors 401 nor 403-405. As a result, the data written to section 402 can be recovered from the other sectors 401, 403-405. Likewise, other placements of a similarly-sized mechanical error on the surface of disk 440 would also similarly affect only one of the sectors 401-405.

Experimental data analyzed by the inventors show that approximately as much as a half order of magnitude reduction in data loss probability can be made by excluding the outer 5-7% of the disk in some designs. In other designs, the results of excluding the outer 5-7% of the disk may be less dramatic, but may still be worthwhile given the outer rim of the disk is especially prone to deformation, scratching, and the like from standard use. Inside of the outer 7% of the disk, the error rate is approximately uniform across the recorded area for the remainder of UDF disk.

Figure 5:
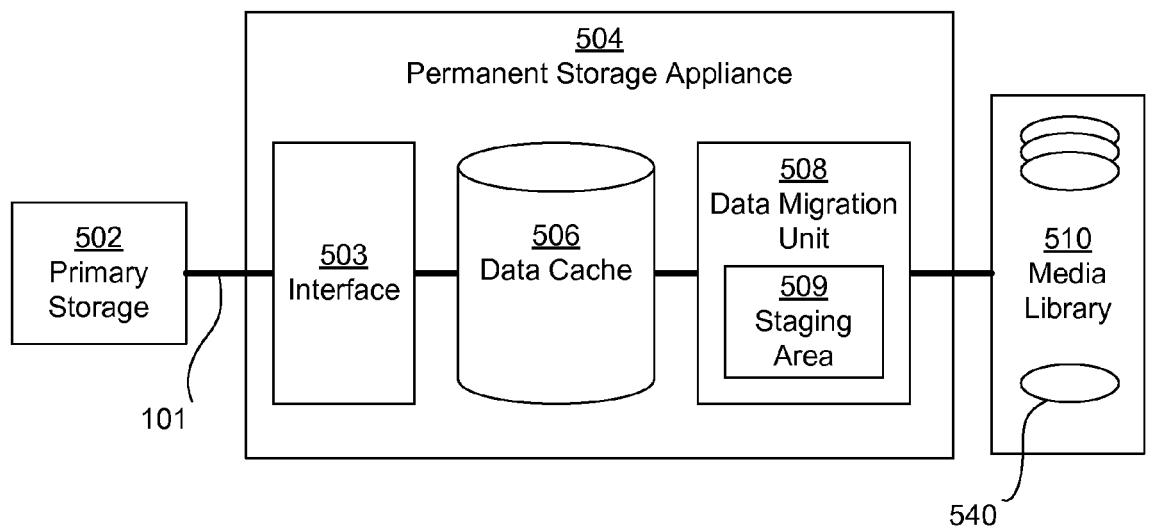
FIG. 5 illustrates a system for storing data in accordance with one embodiment.

FIG. 5 illustrates a system 500 for storing data in accordance with one embodiment. The system 500 includes at least one primary storage 102 connected via network 101 to a permanent storage appliance 504 which is connected to a media library or libraries 510. The figure does not show a number of conventional components (e.g. client computers, firewalls, routers, etc.) in order to not obscure the relevant details of the embodiment.

The primary storage 502 can be any data storage device, such as a networked hard disk, floppy disk, CD-ROM, tape drive, or memory card. It can be storage internal to a client computer on the network or a stand-alone storage device connected to the network. As shown in FIG. 5, the primary storage 502 is connected to the permanent storage appliance 504, for example, through a network connection 101. The network 101 can be any network, such as the Internet, a LAN, a MAN, a WAN, a wired or wireless network, a private network, or a virtual private network.

The permanent storage appliance 504 performs control and management of the media library or libraries 510, and allows access to the media library or libraries 510 through standard network file access protocols. The permanent storage appliance 504 includes interface 503, data cache 506 and data migration unit 508. The interface 503 allows access to archived files from the permanent storage appliance 504 over the network 101. In one embodiment, the Network File System (NFS) protocol is used to access files over the network. When NFS is used, the permanent storage appliance 504 can implement an NFS daemon. In one implementation, Network File System v3 and v4 are supported. Alternatively or additionally, the Common Internet File System (CIFS) or Server Message Block (SMB) protocol can be used to access files over the network. In one implementation, Samba is used for supporting CIFS protocol. Alternatively or additionally, other protocols can be used to access files over the network, and complementary interfaces 503 can be implemented as will be recognized by those of skill in the art.

In one embodiment, the data cache 506 file system is XFS™, a journaling file system created by Silicon Graphics Inc. for UNIX implementation. XFS™ implements the Data Management Application Program Interface (DMAPI) to support Hierarchical Storage Management (HSM), a data storage technique that allows an application to automatically move data between high-speed storage devices, such as hard disk drives to lower speed devices, such as optical discs and tape drives. The HSM system stores the bulk of the data on slower devices, and copies data to faster disk drives when needed. In one embodiment, the data cache 506 supports RAID level 5 and implements the logical redundancy and spatial separation techniques described herein. In other embodiments, other RAID levels can be supported and/or other redundancies of data can be implemented within the data cache 506 to improve confidence in the safety and integrity of data transferred to the permanent storage appliance 504. In one embodiment, the data cache 506 is disk-based for fast access to the most recently accessed data. Cached data can be replaced by more recently accessed data as necessary.

The data migration unit 508 within the permanent storage appliance 504 is used to copy data to and read data from the media library or libraries 510. The data migration unit 508 includes a staging area 509. The data migration unit 508 copies data from the data cache 506 to the media library 510 once a full media image is available. The data migration unit 508 uses the staging area 509 to store the media image temporarily until the data migration unit 508 has written the media image to the media library 510. The data migration unit 508 can also read media from the media library or libraries 510 and cache files in the data cache 506 before delivering them to the requesting client via the network 101.

Media library 510 can be, for example, a collection of optical disks and one or more disk drives organized in one or more jukeboxes. In another embodiment, media library 510 can contain data stored on any other disk storage media known to those of skill in the art.

Optionally, permanent storage appliance 504 can include a graphical user interface (GUI) (not shown). The GUI allows a user to access optional and/or customizable features of the permanent storage appliance 504, and can allow an administrator to set policies for the operation of the permanent storage appliance 504. In one embodiment, the permanent storage appliance 504 includes a web server, such as an Apache web server that, in conjunction with the GUI, allows a user to access optional and/or customizable features of the permanent storage appliance 504. Alternatively or additionally to a GUI, the permanent storage appliance 504 can include a command line interface.

Figure 6:
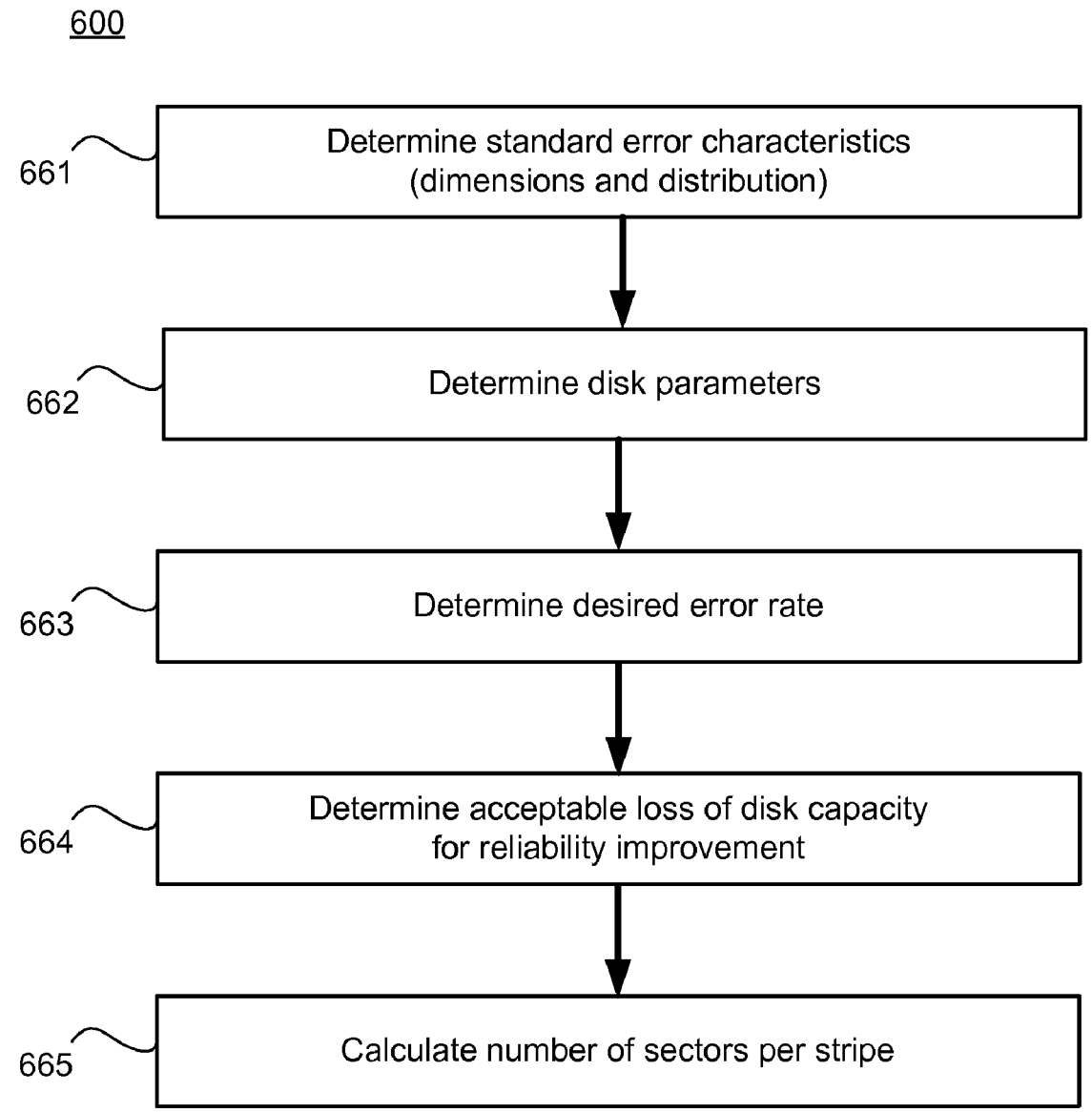
FIG. 6 is a flow chart illustrating a method of calculating the number of sectors per stripe, in accordance with one embodiment.

FIG. 6 is a flow chart illustrating a method 600 of calculating the number of sectors per stripe to use to meet particular performance goals. In step 661, standard error characteristics, i.e., the dimensions and distribution of standard errors, are determined. For example, in one implementation, it may be determined that the storage media is particularly vulnerable to errors caused by fingerprints because the media will be handled. In this example, the standard dimensions and distribution of fingerprints is determined. For example, according to one measurement, an average thumbprint is 15 mm in length. In another example, it may be determined that the storage media is particularly vulnerable to scratches because of the environmental conditions of the storage media. Thus, the dimensions and distribution of standard scratches can be determined in step 661. In some cases, the errors may be assumed to be equally distributed. In other cases, the errors may be grouped, for example, toward the outer edge of the disk. The characteristics of the standard errors impact the error rate, and thus impact the number of sectors per stripe used to protect against them.

In step 662, the disk parameters are determined. In one embodiment, the disk parameters are input by a user. In another embodiment, a user selects a disk type, and the disk parameters associated with the disk type are accessed from a database in storage. In one implementation, the disk parameters include amount of storage capacity and the physical dimensions and layout of the storage media. Other disk parameters that may be determined include disk sector length, tracks per inch, minimum reported error length, minimum inherent disk technology ECC error length, number of layers, total capacity, session size, physical sectors per revolution as a function of radius, and sparing areas.

In step 663, the desired error rate is determined. In one embodiment, the desired error rate is input from requirements of a standards organization. In another embodiment, it is a maximum error rate allowed by a user or specified by an insurer.

In step 664, the acceptable loss of disk capacity for reliability improvement is determined. In one embodiment, only 10% of the disk capacity is available for the ECC data 120. In other implementations, the amount of disk capacity to sacrifice for reliability improvement may be greater or less than 10%. As has been described above with reference to FIG. 1B, there is a tradeoff between error rate and storage capacity. Generally, to attain lower error rates, additional storage capacity is given up to make room for redundant data used to recover data in case of errors.

In step 665, the number of sectors per stripe is calculated from the standard error characteristics, the disk parameters, the desired error rate, and the acceptable loss of disk capacity. As described above, the larger the number of sectors in a stripe 110, the less reliability improvement is obtained. Thus, to maximize the reliability improvements, the minimum value of sectors per stripe is used as determined by the amount of acceptable loss of disk capacity for the sake of reliability improvement. Unlike RAID 5 disk arrays, the capacity penalty versus error rate improvement is tunable. A higher capacity can be sacrificed for greater reliability improvement, or reliability can be sacrificed for higher data storage capacity as desired.

For example, if the standard error characteristics are determined 661 to be fingerprints 15 mm in diameter and it is determined that only one is likely to occur at a random location on the disk media, and the disk parameters are determined 662 to be a 5.25 inch optical disk, and the desired error rate is determined 663 to be 1/1E15, and the acceptable loss of disk capacity for reliability improvement is determined 664 to be 15%, then the number of sectors per stripe can be calculated 665 to be 8 according to the equation method described above.

Figure 7:
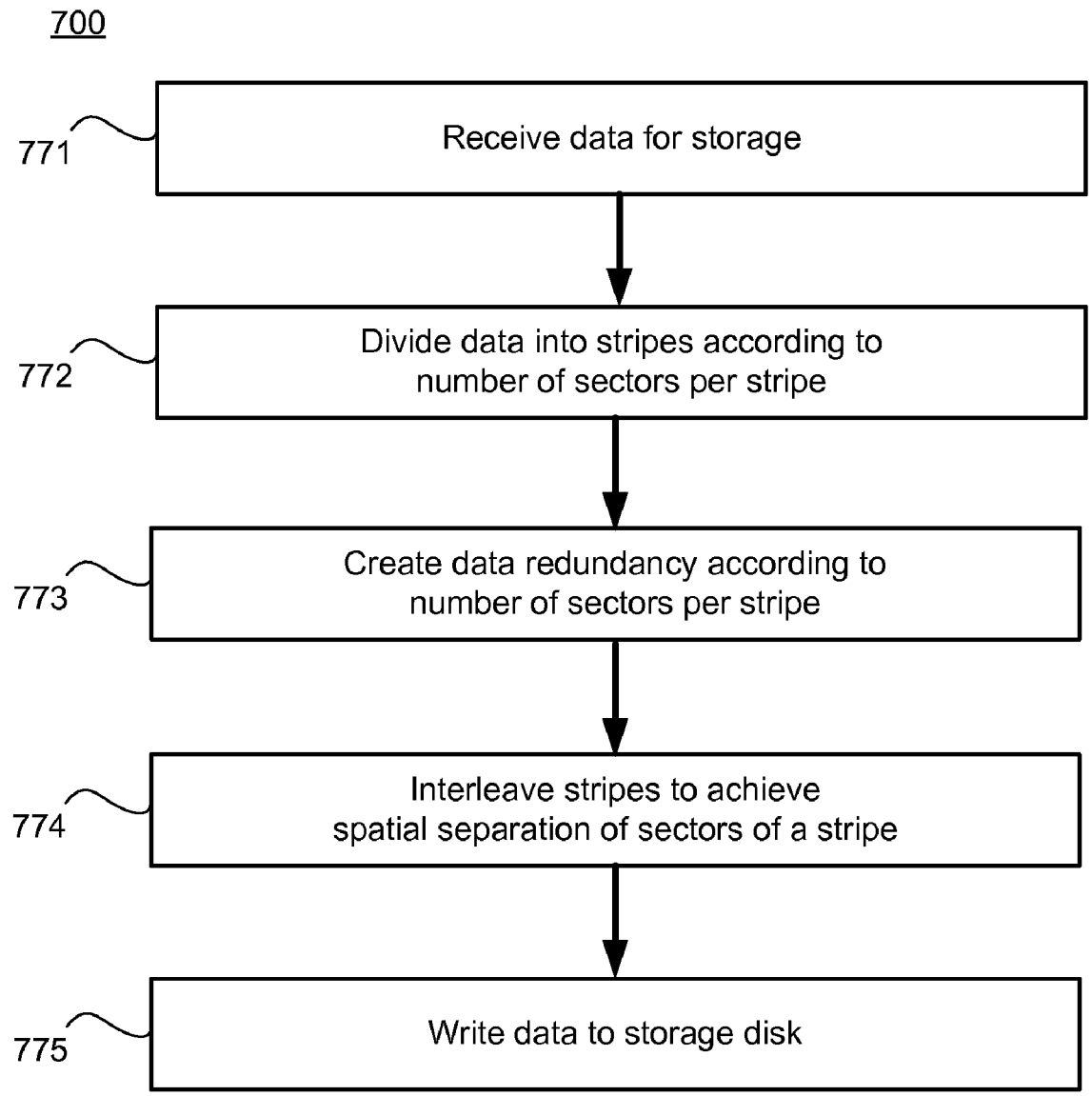
FIG. 7 is a flow chart of a method for storing data on a disk using data redundancy and spatial separation in accordance with one embodiment.

FIG. 7 is a flow chart of a method 700 for storing data on a disk using data redundancy and spatial separation in accordance with one embodiment. In step 771, the data for storage is received. For example, the permanent storage appliance 504 receives the data from primary storage 502 over network 101.

In step 772, the data is divided into stripes according to the number of sectors per stripe. In one embodiment, the number of sectors per stripe was calculated according to the method 600 described with reference to FIG. 6. In another embodiment, the number of sectors per stripe is a previously fixed number, for example, 15 sectors.

In step 773, data redundancy is created according to the number of sectors per stripe. In one implementation, a checksum is calculated using Csum(S)=S(1) XOR S(2) . . . XOR S(M), similar to the checksum calculation used for disk RAID subsystems known in the art. The checksum for each stripe 110 is written to a sector 120 within the Csum data section 164 of the UDF payload 162. Alternatively, any other ECC algorithm known in the art can be used to create the data redundancy in step 773.

In step 774, the stripes are interleaved to achieve spatial separation of sectors of a stripe. Thus, sectors from the same stripe 110 do not occur in the immediate vicinity of each other. Rather, the sectors of a stripe are placed at intervals, for example at least 10 sectors from each other with other sectors from other stripes between them. The spatial separation of sectors from a stripe 110 is beneficial because it reduces the likelihood that common causes of errors that affect a few contiguous sectors, such as thumbprints or scratches, will compromise more than one sector of a stripe 110. In one implementation, sectors are approximately 5 mm long, and the most common cause of error are fingerprints, which are approximately 15 mm in diameter. Thus, in one embodiment, the physical separation of sectors is met by placing each sector of a stripe two full revolutions plus three sectors away from the previous sector in the stripe so that it is unlikely that a fingerprint will destroy two sectors of the same stripe.

In one embodiment, it is beneficial to place sectors of the same stripe at the minimum distance from each other required by the desired error rate for improved speed of access by, for example, the data migration unit 508 of a permanent storage appliance 504. The data migration unit reads media from the media library or libraries 510 and caches files in the data cache 506 before delivering them to the requesting client via the network 101. The data can be read from a disk 540 in the media library 510 sequentially for speed. Thus, the tighter the grouping of the sectors of the stripe, the faster the access to the data.

In step 775, the data is written to the storage disk in accordance with the determined layout of interleaved stripes. For example, a permanent storage appliance 504 writes the data to a storage disk 540 in the media library 510. Thus, the data is stored with the logical redundancy and spatial separation to improve the likelihood that the data can be recovered despite the presence of an error that prevents one sector from being read correctly.

The above description is included to illustrate the operation of the embodiments and is not meant to limit the scope of the invention. From the above discussion, many variations will be apparent to one skilled in the relevant art that would yet be encompassed by the spirit and scope of the invention. Those of skill in the art will also appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "copying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of recording data on disk storage media with logical redundancy and spatial separation for error protection, the method comprising:
dividing data for storage into at least one logical storage unit, each logical storage unit comprising at least two sectors;
determining a checksum for each logical storage unit; and
recording each of the sectors and the checksum for each logical storage unit at locations on a disk storage medium spatially separated from each other by at least a predefined interval such that localized damage is unlikely to affect more than one sector of the logical storage unit, wherein the stored data is recovered despite localized damage affecting one sector of the logical storage unit.

2. The method of claim 1, wherein the recording on the disk storage medium is Universal Disk Format compatible.

3. The method of claim 1, wherein each logical storage unit comprises at least 10 sectors.

4. The method of claim 1, wherein each sector comprises 2 KB of data.

5. The method of claim 1, wherein the disk storage medium comprises a single layer disk.

6. The method of claim 1, wherein the disk storage medium comprises a double layer disk.

7. The method of claim 1, wherein the logical storage units are interleaved together.

8. The method of claim 1, wherein each logical storage unit comprises a number of sectors that depends on a radial position of the logical storage unit on the disk storage medium.

9. The method of claim 1, wherein the sectors and the checksum for each logical storage unit are recorded on a disk storage medium at intervals of at least 32 sectors.

10. The method of claim 1, wherein the sectors and the checksum for each logical storage unit are recorded on a disk storage medium at intervals of at least 10 sectors.

11. The method of claim 1, wherein the localized damage comprises damage from at least one from a group consisting of a fingerprint and a scratch.

12. A computer program product for recording data on disk storage media with logical redundancy and spatial separation for error protection, the computer program product stored on a computer readable medium comprising a code that, when executed by a processor causes a computer to perform the operation of:
dividing data for storage into at least one logical storage unit, each logical storage unit comprising at least two sectors;
determining a checksum for each logical storage unit; and
recording each of the sectors and the checksum for each logical storage unit at locations on a disk storage medium spatially separated from each other by at least a predefined interval such that localized damage is unlikely to affect more than one sector of the logical storage unit, wherein the stored data is recovered despite localized damage affecting one sector of the logical storage unit.

13. The computer program product of claim 12, wherein the localized damage comprises damage from at least one from a group consisting of a fingerprint and a scratch.

* * * * *